United States Patent

[11] 3,614,132

| [72] | Inventor | Donald T. Ashworth |
|---|---|---|
|  |  | 15 Hammett St., Anderson, S.C. 29621 |
| [21] | Appl. No. | 867,215 |
| [22] | Filed | Oct. 17, 1969 |
| [45] | Patented | Oct. 19, 1971 |

[54] BICYCLE PARACHUTE
1 Claim, 5 Drawing Figs.

| [52] | U.S. Cl. | 280/289 |
| [51] | Int. Cl. | B62j 27/00 |
| [50] | Field of Search | 280/289, 213; 244/113; 46/86 |

[56] References Cited
UNITED STATES PATENTS
| 1,940,950 | 12/1933 | Honeywell | 244/113.5 |
| 2,363,732 | 11/1944 | Jenkins | 244/113 |
| 3,380,756 | 4/1968 | Poynter | 280/289 |

*Primary Examiner*—Benjamin Hersh
*Assistant Examiner*—Robert R. Song
*Attorney*—John B. Dickman, III ABSTRACT: A housing having a pivoted bottom retaining a collapsed and folded drag parachute therein. The housing is mounted near the rear of a bicycle and a remote release cord is attached to the bottom to release the parachute so that it will deploy and billow out to the rear and slow the bicycle and simulate a drag parachute used to slow a drag racer or other fast moving vehicles.

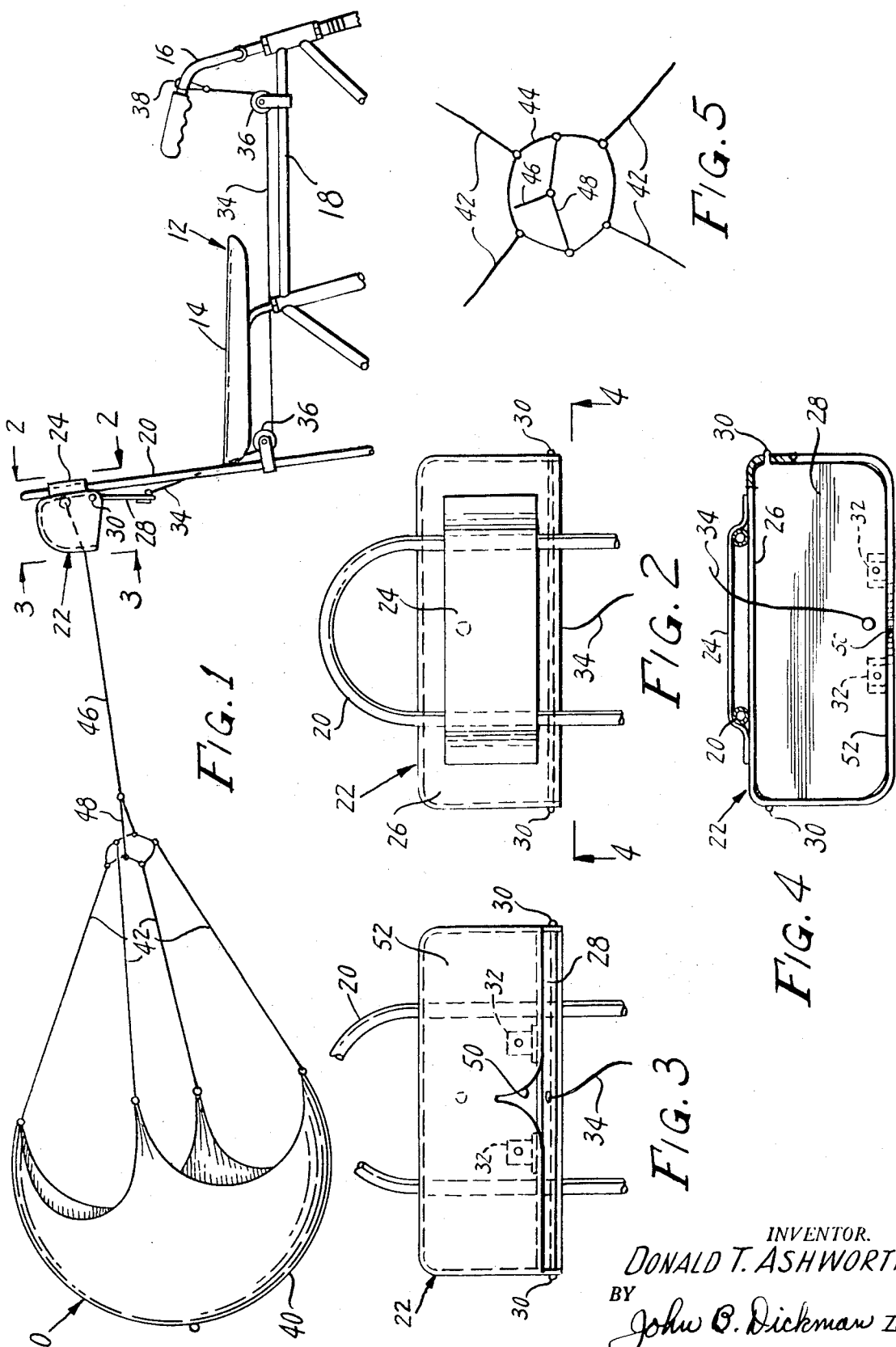

BICYCLE PARACHUTE

The present invention generally relates to an attachment for bicycles and more particularly an attachment in the form of a drag parachute which may be selectively deployed by the bicycle operator to simulate the release of such a drag parachute by a drag racer.

An object of the present invention is to provide a bicycle attachment in the form of a housing releaseably retaining a folded and collapsed parachute therein and being mounted on the rear portion of a bicycle with a remote control line extending to the handlebars to enable actuation of the parachute.

Another object of this invention is to provide a drag parachute attachment for a bicycle as set forth in the preceding object in which the housing is mounted on an upstanding support bar disposed rearwardly of the elongated seat structure and orients the point of attachment of the parachute above the seat.

A further object of the present invention is to provide an attachment for bicycles which is simple in construction, easy to attach, effective for slowing a bicycle and simulating a drag parachute on a drag racer and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the drag parachute in use behind a bicycle.

FIG. 2 is a front elevational view taken along reference line 2—2 on Fig. 1 showing the mounting means for the housing.

FIG. 3 is a rear elevational view taken along reference line 3—3 on Fig. 1 showing the structure of the housing.

FIG. 4 is a bottom plan view taken along reference line 4—4 on Fig. 2 showing the structure of the hinged lid.

FIG. 5 is a fragmental view of the connecting line interconnecting the shroud lines on the parachute.

Referring now specifically to the drawings, the drag parachute 10 is mounted on the rear of a bicycle 12 which includes the usual seat 14, handlebars 16, frame 18 and upstanding inverted U-shaped bar 20 extending upwardly behind the rear edge of the seat 14. The bar 20 is usually referred to as a "wheelie" bar and the parachute 10 acts to slow the bicycle and simulate a drag chute such as is normally used on drag racers.

A rectangular housing 22 is mounted on the bar 20 by the use of a mounting strap 24 which may be in the form of a rubber strap attached to the front plate 26 of housing 22 for resiliently and frictionally securing the housing in place. The bottom of the housing 22 is closed by a pivotal bottom lid 28 connected to the front plate 26 by a hinge 30 and releaseably held in closed position by permanent magnets 32 at the rear edge of the housing 22. A flexible line 34 is attached to the rear edge portion of the lid 28 and extends down and forwardly under the seat and along the frame 18 with forward and rear guide pulleys 36 guiding the line 34 during linear movement. The forward end of the line 34 is connected to the handlebars 16 by a loose loop 38 so that the line 34 may be easily grasped and moved to open the lid 28 to discharge the parachute 10 which is stored in the housing 22 in a folded and collapsed condition.

The parachute 10 includes the usual canopy 40 and shroud lines 42 connected thereto. The free ends of the shroud lines 42 are interconnected by a flexible loop 44 having an anchoring line 46 attached thereto by a bridle 48 attached at opposite sides of the loop 44. The other end of the line 46 is anchored interiorly of the housing 22 and is received in a downwardly flaring centering notch 50 in the rear wall 52 of the housing 22.

If necessary, weights may be added to the parachute to facilitate deployment thereof from the housing which may be of adequate dimensions and constructed of any suitable material. The lid may be held in closed position by any suitable means until it is desired to release the parachute which may be constructed of various materials. The housing may be supported in various ways from the support bar or on other components of the bicycle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An attachment for bicycles of the type having an upstanding support bar mounted adjacent the rear portion of the seat, said attachment comprising a housing removably mounted on said support bar by a resilient strap, a drag parachute disposed in collapsed condition in said housing and being anchored thereto, a pivoted bottom lid on said housing, coacting magnetic holding means on said housing and said lid to releasably retain said lid on said housing in closed position, and a cord connected to said lid and extending to the front handlebars whereby a pull from the rider will overcome the magnetic attachment of the lid to the housing and allow the parachute to escape from the housing.